United States Patent
Singh et al.

(10) Patent No.: US 8,562,887 B2
(45) Date of Patent: Oct. 22, 2013

(54) FABRICATION METHOD OF MULTI-FUNCTIONAL COMPOSITES FROM PRE/POST-CONSUMER CARPET

(75) Inventors: Abhishek Kumar Singh, Stillwater, OK (US); Gajendra Pandey, Stillwater, OK (US); Ranji Vaidyanathan, Stillwater, OK (US); Raman Pal Singh, Tulsa, OK (US); Kenny L. Townsend, Durant, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 877 days.

(21) Appl. No.: 12/695,730

(22) Filed: Jan. 28, 2010

(65) Prior Publication Data

US 2010/0193987 A1 Aug. 5, 2010

Related U.S. Application Data

(60) Provisional application No. 61/148,764, filed on Jan. 30, 2009.

(51) Int. Cl.
*B27N 3/10* (2006.01)
(52) U.S. Cl.
USPC .......................................... 264/257

(58) Field of Classification Search
USPC ............................................ 264/257
See application file for complete search history.

(56) References Cited

U.S. PATENT DOCUMENTS

| 5,702,663 | A | 12/1997 | Seemann |
| 6,586,054 | B2 | 7/2003 | Walsh |
| 7,147,818 | B1 | 12/2006 | Rigas et al. |
| 2004/0062904 | A1 | 4/2004 | Rice et al. |
| 2007/0063393 | A1 | 3/2007 | Vernin et al. |

FOREIGN PATENT DOCUMENTS

EP 1264670 12/2002

OTHER PUBLICATIONS

European Patent Office PCT International Search Report, International Application PCT/US2010/022409, mailed Mar. 23, 2010.
European Patent Office PCT Written Opinion of the ISA, International Application PCT/US2010/022409, mailed Mar. 23, 2010.

*Primary Examiner* — Yogendra Gupta
*Assistant Examiner* — John Robitaille
(74) *Attorney, Agent, or Firm* — Fellers, Snider, Blankenship, Bailey & Tippens, P.C.

(57) ABSTRACT

A method of fabricating a composite panel is disclosed. The method includes cutting a portion of carpet, applying vacuum to the carpet portion, transferring resin into the carpet portion under vacuum, and curing the resin impregnated carpet portion.

26 Claims, 4 Drawing Sheets

US 8,562,887 B2

FABRICATION METHOD OF MULTI-FUNCTIONAL COMPOSITES FROM PRE/POST-CONSUMER CARPET

CROSS REFERENCE TO RELATED APPLICATIONS

This application claims the priority of U.S. Provisional Patent Application No. 61/148,764 entitled "FABRICATION METHOD OF MULTI-FUNCTIONAL COMPOSITES FROM PRE/POST-CONSUMER CARPET," filed Jan. 30, 2009, the contents of which are hereby incorporated by reference.

STATEMENT REGARDING FEDERALLY SPONSORED RESEARCH OR DEVELOPMENT

This invention was made with government support under grant number SBAHQ-06-I-0097 awarded by the U.S. Small Business Administration. The government has certain rights in the invention.

FIELD OF THE INVENTION

This application relates to composite materials in general and, more specifically, to the use of carpet in composite construction.

BACKGROUND OF THE INVENTION

Of the 4.6 million tons of solid waste generated in Oklahoma every year, only 1% is recycled. Currently, only ~2% of discarded carpet (270 million pounds out of 200 million tons) is recycled through recycling programs in the United States. This represents a significant environmental burden on our landfills, a tax burden due to certain state sponsored subsidies, and a lost economic opportunity. The last factor is driven by the lack of high-value, engineering-oriented applications that could leverage advances in manufacturing technology to utilize waste to deliver commercially viable products. These advanced engineered materials are expected to have specific applications in a variety of fields ranging from sound protection of civil infrastructure to tooling materials for aerospace structures.

The carpet industry is a $10 billion-plus dollar industry. Over 3 million tons of carpet is produced every year and about 2 million tons are discarded. Overall in the United States, carpet accounts for about 1% of municipal solid waste by weight and 2% by volume. This is not a small amount.

What is needed is a system and method for addressing the above and related concerns.

SUMMARY OF THE INVENTION

The invention of the present disclosure, in one aspect thereof, comprises a method of fabricating a composite panel. The method includes cutting a portion of carpet, applying vacuum to the carpet portion, transferring resin into the carpet portion under vacuum, and curing the resin impregnated carpet portion.

In some embodiments, a reinforcement may be applied to the carpet portion. Vacuum film may also be utilized, along with peel plies and transfer media. The vacuum film may be sealed to the mold. The resin impregnated carpet portion may also be hot pressed. Some embodiments will provide a carpet portion with at least two layers of carpet. These may be placed back to back, fiber to fiber, or fiber to back.

DETAILED DESCRIPTION OF THE PREFERRED EMBODIMENTS

The technologies of the present disclosure present low cost processes based on vacuum-assisted resin transfer molding (VARTM) that takes advantage of the 3-D fiber architecture of carpet. The aspect ratio of the carpet fibers may be utilized so that higher mechanical properties can be obtained than are otherwise currently possible. Materials for use where high impact resistance is required may be achieved by promoting an adhesion between a composite matrix and nylon fibers through an appropriate compatibilizer, and by adding layers of impact resistant fiber architectures such as spectra and 3-D glass fabric between the carpet layers. Compatibilizers may either be utilized to prepare the carpet fibers prior to resin application and/or be included with the resin.

Figure 1:
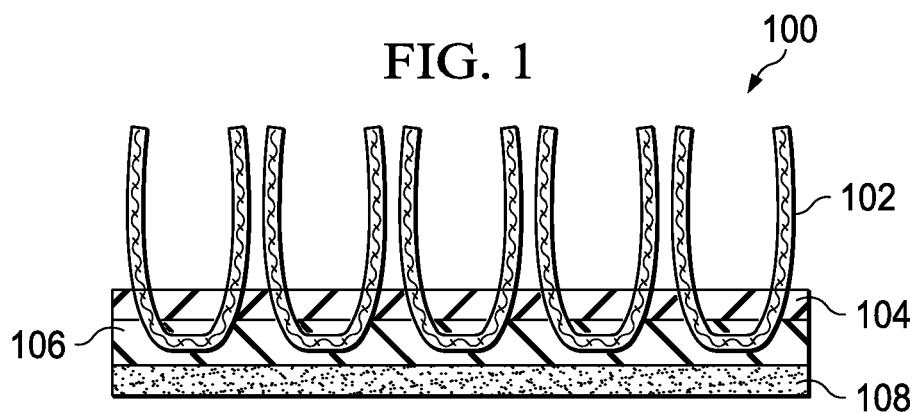
FIG. 1 is a side cutaway view of a carpet construction.

Referring now to FIG. 1, a side cutaway view of a carpet construction 100 is shown. The present disclosure discusses the fabrication of composite panels with carpet panels as a substrate. It is understood that the present disclosure is not limited by whether or not the carpet is used, new manufacture, or overstock. The methods of the present disclosure work equally well regardless of the source of the carpet. Most carpet consists of about 20-50 percent by weight face fiber 102, which may comprise nylon, cotton, or other synthetic or natural material. Layers of backing materials 104, 106, and an adhesive 108, which attaches the carpet fiber to the backing material are also part of the structure 100. The backing materials may be polypropylene or other materials or composite. The adhesive 108 may comprise a carboxylated styrene-butadiene (XSB) latex copolymer, and an inorganic filler like calcium carbonate. Further, while cured thermosetting systems may under certain circumstance be recoverable, they are not capable of being reused as raw polymeric components in the manufacture of a second-generation carpet.

Figure 2:
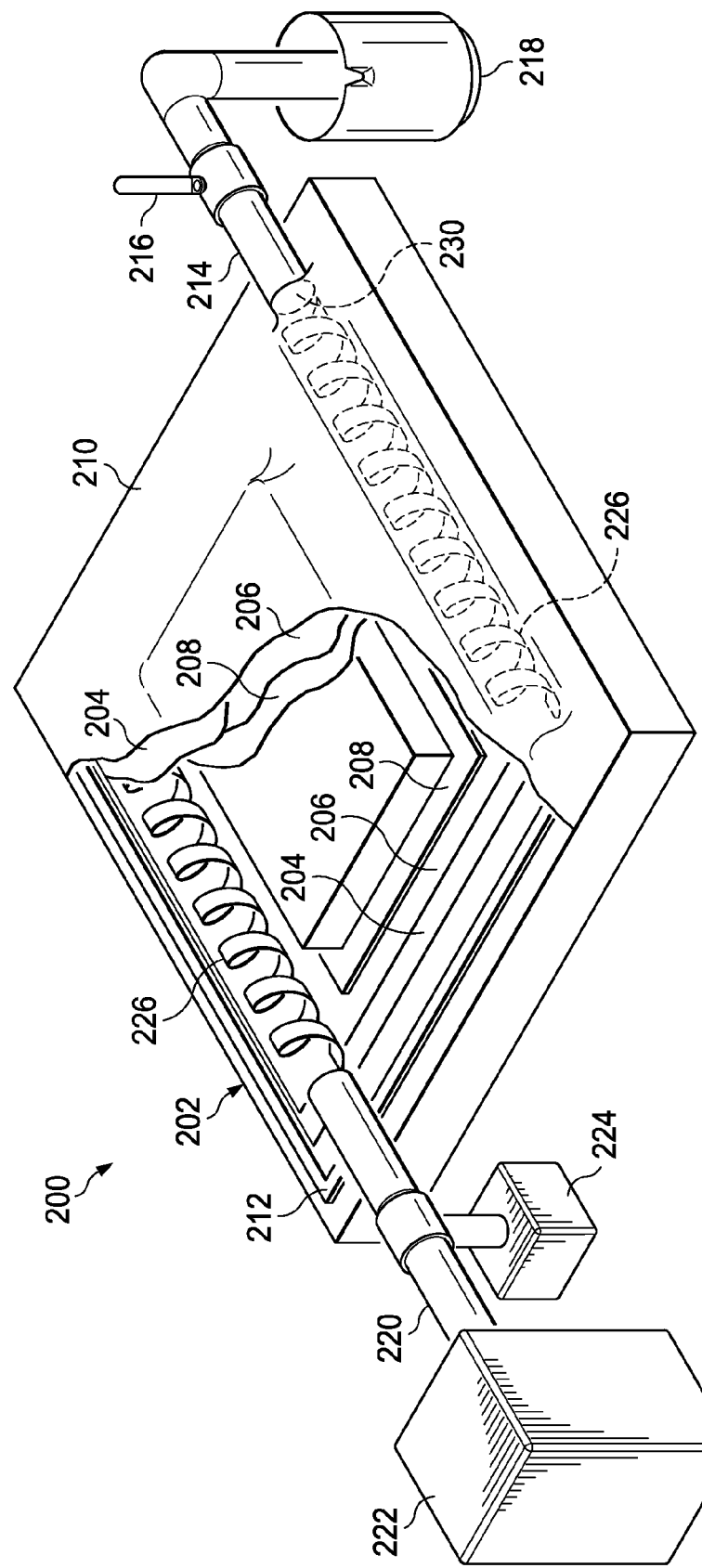
FIG. 2 is a side perspective view of a fabrication setup for creating recycled carpet composite materials.

Referring now to FIG. 2, a cutaway perspective view of a fabrication setup 200 for creating carpet based composite panels 100 is shown. The first step is to clean a mold 202 and apply release film 204 on it. The release film aids in the removal of the panel 100 from the mold surface 202 after infusion and curing. In order to transfer the resin quickly and efficiently over the sample, two pieces of transfer media 206 may be cut—one for the bottom face and one for the top face of the sample 100. The size of the transfer media 206 should be such that starting from an inlet pipe 216 it spreads along the entire length of the panel 100 and should be about 1-2 inches bigger at the remaining sides. The transfer media 206 may not be utilized in every case. In one embodiment, the transfer media 206 serves to prevent collapse under a vacuum bag 210 that might prevent adequate flow of resin. Therefore, any porous, textured, honeycombed, or sufficiently durable material with passages for resin flow under vacuum could be used.

One piece of the transfer media 206 is placed on the mold surface 202. Two pieces of peel ply 208 of appropriate size are then cut. Where final appearance is important, the peel plies 208 may be useful used for protecting the panel 100 surfaces from the impressions of the transfer media 206 and wrinkles caused by a vacuum bag 210. The peel plies 208 may also aid in removal of panel 100 from under the vacuum bag 210. Above the bottom portion of the transfer media 206 is the peel ply 208. The panel 100 is placed on the peel ply 208, and another layer of peel ply 208 is placed on the panel 100. On top of this is placed the other portion of the transfer media 206. Vacuum bag sealant 212 (such as tacky tape) is then placed around the sample 100.

The resin inlet pipe 214 is placed on top of the sealant 212, near one corner. Additional sealant may be applied to and around an opening 230 for the pipe 214 in order for the vacuum bag to stick properly and close any gaps. The inlet pipe 214 may be placed such that it is 1-2 inches inside the sealant 212. This arrangement may be further understood by reference to the cutaway portion of FIG. 2 showing an outlet pipe 220 is similarly arranged.

In some embodiments, two pieces of the spiral wrap 226 may be cut to a size at least the width of the fiber cloth 110. Both spiral wraps 226 are connected to the inlet and outlet pipes 214, 220. The spiral wrap 226 is placed in between the transfer media 206 (top and bottom) at the inlet. A sufficiently large vacuum bag 210 film is cut and stuck to the sealant 212. Care should be taken to avoid folds in the vacuum bag. A valve 216 may be installed in the resin inlet pipe to control resin flow from a reservoir 218. It is understood that any resin having suitable mechanical and chemical properties may be utilized. Non limiting examples include epoxies, vinylesters, polyesters, polyurethanes, polyvinyl chlorides, cynate esters, and/or other thermoplastic or thermosetting resins. The outlet pipe 220 may be connected to a vacuum pump 220 via a resin trap 224. In some cases, due to the structure of the carpet panel 100, the spiral wraps 226 may not be needed to obtain sufficient resin flow under pressure.

To check the vacuum, the inlet valve 216 may be closed and the vacuum pump 222 activated. If proper vacuum is maintained, the system 200 is ready. If not, the vacuum bag 210 may be checked at the sealant 212 for any leakage.

The infusion process may begin with the application of vacuum pressure under the bag 210. In one embodiment of the method, full vacuum is applied for 15 minutes before the infusion. This minimizes air inside the carpet panel 100. After the application of full vacuum for 15 minutes the pressure should be reduced to a desired amount of pressure that is required for the flow of the resin. Once the desired pressure is achieved, the inlet pipe should be dipped into the beaker or reservoir 218 containing the resin (or otherwise attached to a resin source). The transfer media 206 permits the flow of the resin with ease. After the resin moves across the length of the setup from inlet to outlet and wets the fibers or the fiber cloth 110 completely, the inlet valve 216 may be kept open for about the next 5 minutes at the same level of pressure. This ensures that the resin has completely wetted the fibers. Then, the inlet valve 216 is closed. The vacuum remains on and pulls gas out of the mold that may be given off by the resin. After 10 minutes the pressure may be reduced slowly to 0" of Hg.

The panel 100 may be left at room temperature for 10-12 hours for curing. A post curing process begins with debagging the panel 100 and placing it in an oven as a freestanding part. In one embodiment, post curing is done for 8 hours at about 75 degrees C. The final part is allowed to cool to room temperature. In some embodiments, additional steps may be taken. For example, two resin impregnated carpet panels may be hot pressed together. In another embodiment, the panel 100 may comprise multiple layers of carpet that are resin impregnated together under vacuum. Whether the panels 100 are assembled together before or after the VARTM process, they may be arranged one atop the other, backing to backing, fiber to fiber, or in combinations of these where 3 or more plies are used.

Figure 3:
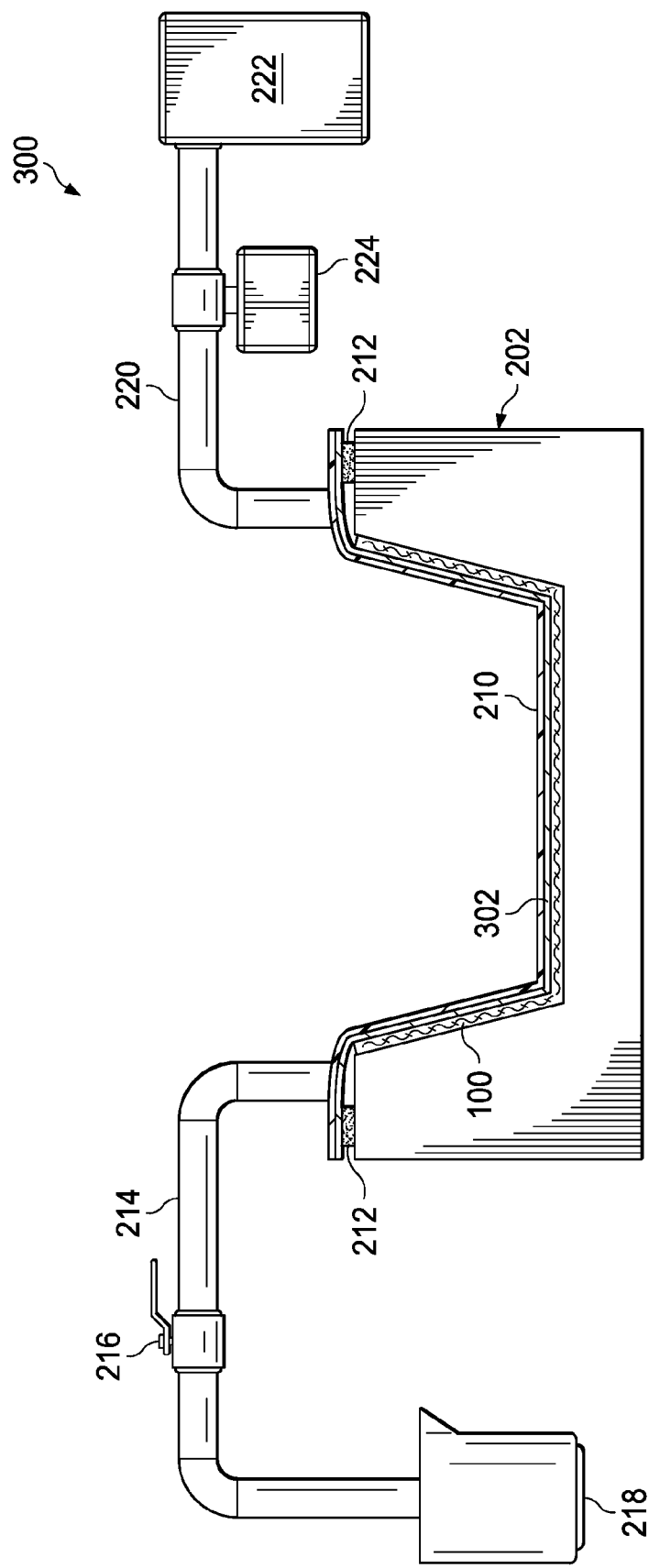
FIG. 3 is a side cutaway view of another fabrication setup for creating recycled carpet composite materials.

FIG. 3 is a side cutaway view of another fabrication setup for creating recycled carpet composite materials according to the present disclosure. The setup 300 of FIG. 3 is operationally similar to that of FIG. 2. However, here it can be seen that the mold 202 has a three dimensional shape. It will be appreciated that complex shapes may be achieved using the methods of the present disclosure. A combination of shaped molds, post mold hot pressing, and/or assembly of discrete components can yield complex and useful structures. Non limiting examples of structures that may be constructed include containers, feed bins, sound proofing panels, sound barrier walls, composite roofing, construction materials, and shipping pallets.

In FIG. 3, the carpet panel 100 has been placed in the mold 202 and conformed to its basic shape. Peel plies and transfer media may be used in this embodiment as well but are not shown for simplicity. In the present embodiment, to ensure that the panel 100 maintains the correct shape, a reinforcement 302 may be placed over the panel 100. The panel may be metallic or a polymer. In some embodiments, this may be removed from the panel 100 or it may remain as an integral component. As before, the vacuum bag 210 is placed over the sample 100 and the bag 210 may be sealed to the mold 202 with tape 212. A vacuum may be created by the vacuum pump 218 allowing which is used to draw in resin from the resin container 218. A curing process may proceed as described above, with the end result being a carpet based composite panel having a complex shape according to the mold 202 and/or the reinforcement 302.

For establishing feasibility of the processes described herein, post consumer carpet and a commercially available VAR™'able resin system, SC-79 from Applied Poleramic Inc., (Benicia, Calif., USA) were acquired. Other facilities included a VARTM setup as described above and a Hot press.

2"×12" samples were fabricated using the vacuum assisted resin transfer molding approach. Three different samples were fabricated. Sample 1 was fabricated with a single layer carpet by infiltrating it with VARTM'able epoxy (SC-79) and left under vacuum for 6 hours. Sample 2 was fabricated with two layers of carpet and SC-79 epoxy. Sample 1 and 2 were subsequently post-cured at 350° F. for 1 hour. Sample 3 was VARTM'ed with two layers of carpet, and subsequently hot pressed at 350° F. for 1 hour.

In sample 1, it was observed that the infiltration of the sample was not yet optimized, while sample 2 showed an improvement in the infiltration of the epoxy resin into the fiber bundles. It should be noted that no compatibilization was used in either of these cases. However, improved interfacial bonding and mechanical properties would be achieved through compatibilization of the nylon fibers with the matrix resin. Similar results were obtained from sample 3 but with a smoother top surface. Additionally, the samples showed very little porosity between the layers indicating that subsequent hot pressing to remove any porosity that was observed in the previous samples.

Figure 4A:
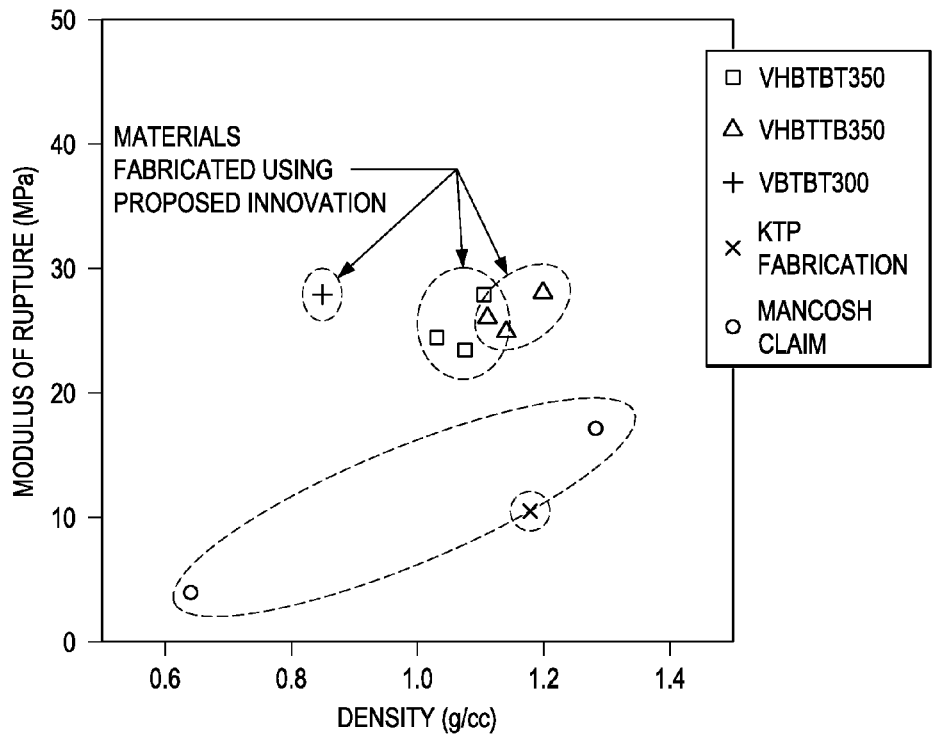
FIGS. 4A and 4B are illustrations of test results for composite panels prepared according to the present disclosure.
Figure 4B:
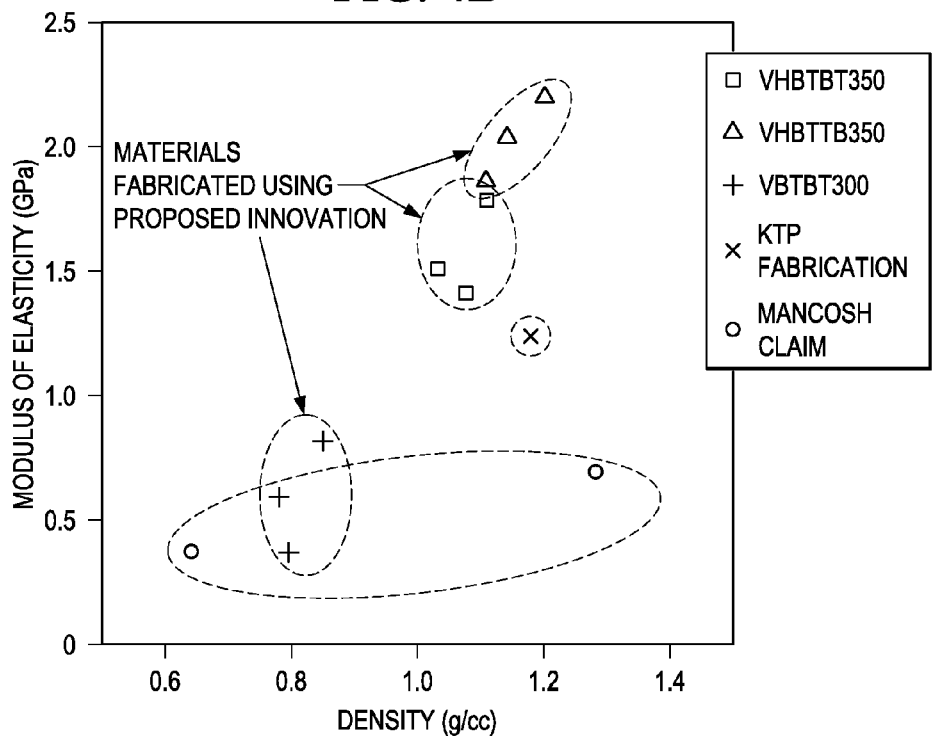

Composite samples of approximate size 228 mm×25.4 mm×12.54 mm were cut from the larger pieces and tested in 3-point bending mode under ASTM D-790 test procedure. The load span was 200 mm. FIG. 4A shows the results for modulus of rupture, while FIG. 4B shows the modulus of elasticity of all the composite samples. For comparison sake, the results for the carpet/HDPE and the results reported by Mancosh are also shown here. It is evident that the VARTM process as well as VARTM and subsequent hot pressing produced significant improvement in both modulus of elasticity and modulus of rupture, demonstrating the promise of the proposed approach.

The single layer carpet epoxy samples after VARTM showed an average modulus of elasticity 0.817 GPa (118.50 ksi), flexural strength 27.91 MPa (4.048 ksi) and density 0.849 g/cc. The two layer carpet epoxy samples after VARTM showed an average modulus of elasticity 1.567 GPa (227.27 ksi), average flexural strength 25.34 MPa (3.68 ksi) and average density of 1.072 g/cc. The two layer carpet epoxy samples after hot pressing showed an average modulus of elasticity 2.041 GPa (296.022 ksi), average flexural strength 26.64 MPa (3.86 ksi) and average density of 1.151 g/cc. In comparison, the carpet/HDPE samples initially fabricated by KT Plastics showed an average modulus of elasticity 1.23 GPa (178.40 ksi), average flexural strength 10.590 MPa (1.54 ksi) and density 1.177 g/cc. The data presented by Mancosh et al. was modulus of elasticity 0.37921-0.6894 GPa (55-100 ksi), flexural strength 4.13-17.23 MPa (1-2.5 ksi) and density 0.6407-1.2815 g/cc.

Without limitation, the functionality of the samples can be varied by using different thermoset or thermoplastics. Specific acoustic properties can be attained by incorporating cenospheres/crumb rubber. Incorporation of spectra based fibers may lead to knife proof vests. Both used and unused carpets can be used to fabricate the composite.

In another test, preliminary samples were fabricated from recycled carpet pieces that were cut into rectangular pieces of approximately 12"×1"×2" thick pieces and stacked inside an aluminum mold. The mold was heated while recycled high density polyethylene (HDPE) was added and heated to temperature of approximately 350° F. to compression mold the carpet/polyethylene mix into a solid composite piece. However, the process suffered from the fact that the cut carpet pieces did not fit perfectly into the mold and the polyethylene was not uniformly spread around the carpet pieces. Due to this fact, the homogeneity of the final composite piece was non-optimal.

Figure 5:
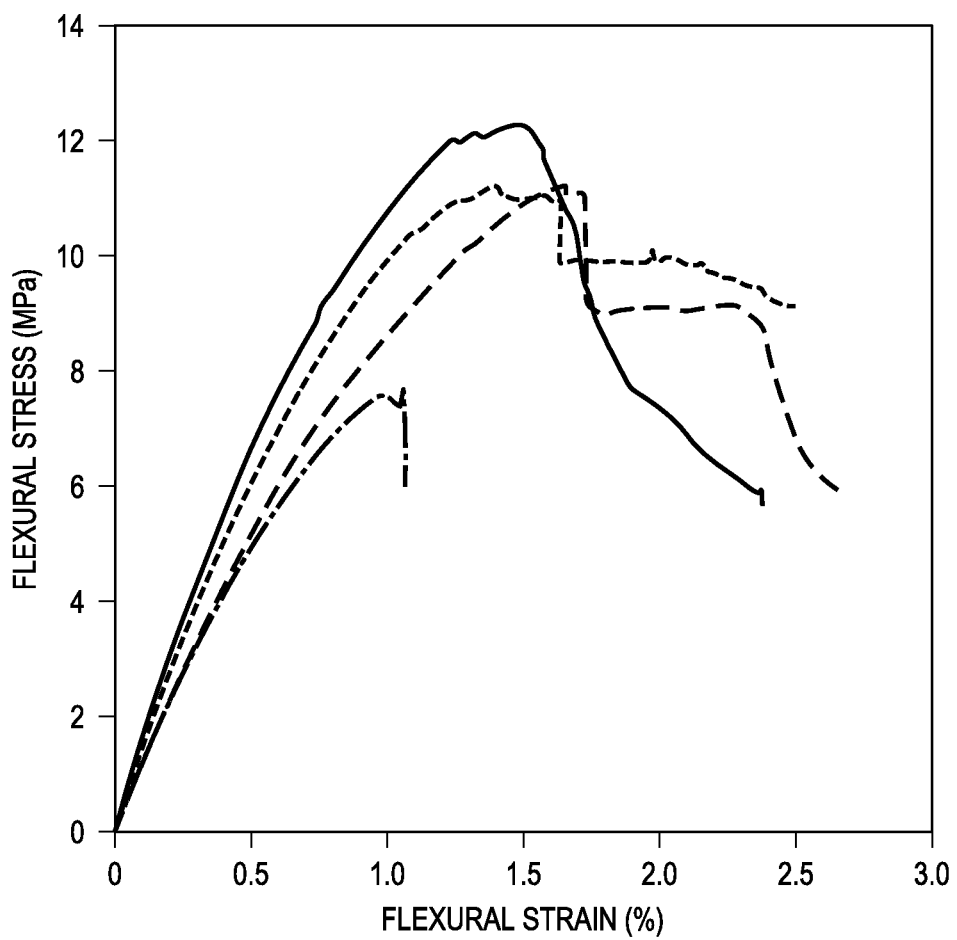
FIG. 5 is a graph illustrating strain properties of composite panels prepared according to the present disclosure.

Nevertheless, composite samples of approximate size 190 mm×15 mm×12 mm were cut from the larger piece and tested in an Instron 5567 mechanical testing equipment using a 30 kN load cell. A 165 mm loading span was used with a 16:1 span to depth ratio and tested in 4-point bending mode under ASTM D6272-02 test protocol. The samples showed an average flexural strength of 10.6±2 MPa (1536±294 psi) and an average flexural modulus of 1.23±0.16 GPa (179±23 Ksi). Typical stress-strain curves obtained for the samples are shown in FIG. 5. The samples exhibited excellent load transfer and failed in a tensile mode, the preferred fracture mechanism for a polymer composite material.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A method of fabricating a composite panel, comprising:
    cutting a portion of carpet, the portion including at least a backing layer and a fiber layer;
    applying vacuum to the carpet portion;
    transferring resin into the fiber layer of the carpet portion under vacuum; and
    curing the resin impregnated carpet portion.

2. The method of claim 1, further comprising applying a reinforcement to the carpet portion.

3. The method of claim 1, further comprising applying a vacuum film to the carpet.

4. The method of claim 1, further comprising applying peel ply to the carpet before applying vacuum.

5. The method of claim 1, further comprising applying a transfer media to the carpet prior to resin transfer.

6. The method of claim 1, further comprising hot pressing the resin impregnated carpet portion.

7. The method of claim 1, wherein the carpet portion includes at least two layers of carpet.

8. The method of claim 7, wherein the two layers of carpet are placed back to back.

9. The method of claim 7, wherein the two layers of carpet are placed fiber to fiber.

10. The method of claim 7, wherein the two layers of carpet are placed fiber to back.

11. The method of claim 1, further comprising:
    placing the carpet into a mold;
    covering the carpet with vacuum film; and
    sealing the vacuum film to the mold.

12. A method of constructing composite panels, comprising:
    placing a carpet piece into a mold;
    covering the carpet piece with a vacuum film and sealing the film to the mold around the carpet piece;
    attaching a vacuum source to the vacuum film;
    attaching a resin source to the vacuum film; and
    applying vacuum to the sealed carpet piece and allowing resin to be transferred into the carpet piece, including a fiber face of the carpet piece, from the resin source.

13. The method of claim 12, wherein the carpet piece comprises multiple layers of carpet.

14. The method of claim 12, further comprising hot pressing the resin filled carpet piece.

15. The method of claim 12, wherein placing the carpet piece into a mold further comprises placing the carpet piece into a three dimensional mold.

16. The method of claim 12, further comprising placing a reinforcement onto the carpet.

17. The method of claim 12, further comprising placing a peel ply and a transfer media onto the carpet piece in the mold.

18. A method of preparing a composite panel, comprising:
    cutting a piece of carpet, the piece including a backing layer and a fiber layer;
    placing a sheet of transfer media and peel ply onto a mold;
    placing the carpet on the peel ply;
    covering the carpet with peel ply and transfer media;
    vacuum bagging the carpet in the mold; and
    transferring resin into the carpet, including the fiber layer, under vacuum.

19. The method of claim 18, further comprising applying reinforcement stock to the carpet.

20. The method of claim 18, further comprising hot pressing the resinated carpet.

21. A method of forming a composite panel comprising:
    preparing strips from carpet, the strips including a backing layer and a fiber layer;
    placing the strips into a mold;
    adding a thermoplastic to the strips in the mold, including the fiber layer; and
    applying heat and compression to the mold.

22. A panel formed by the method of claim 21.

23. A method of forming a solid composite piece comprising:
- providing a piece of carpet having a length and a width and including a backing layer and a fiber layer;
- placing the piece of carpet into a mold;
- adding a thermoplastic to the piece of carpet, including the fiber layer, to form a mixture of thermoplastic and carpet in the mold; and
- applying heat and compression to the mold to mold the mixture into a solid composite piece.

24. A composite piece formed by the method of claim 23.

25. A method of forming a solid composite piece, comprising:
- providing a plurality of pieces of carpet, each piece of carpet having a structured 3 D fiber architecture, a length, a width, a backing layer, and a fiber layer;
- stacking the plurality of pieces of carpet in a mold;
- impregnating the fiber layer of each of the plurality of pieces of carpet with a thermoplastic resin to form a mixture of thermoplastic resin and stacked carpet pieces in the mold; and
- applying heat and compression to the mold to mold the mixture into a solid composite piece.

26. A solid composite piece formed by the method of claim 25, wherein the composite piece comprises a plurality of plies of carpet layered in a continuous thermoplastic matrix.

* * * * *